(12) United States Patent
Kastning et al.

(10) Patent No.: US 10,440,890 B1
(45) Date of Patent: Oct. 15, 2019

(54) HARVESTING TOOL

(71) Applicants: Steven Ray Kastning, Lumsden (CA); Chrisa Dawn Mc-Dougall-Kastning, Lumsden (CA)

(72) Inventors: Steven Ray Kastning, Lumsden (CA); Chrisa Dawn Mc-Dougall-Kastning, Lumsden (CA)

( * ) Notice: Subject to any disclaimer, the term of this patent is extended or adjusted under 35 U.S.C. 154(b) by 0 days.

(21) Appl. No.: 15/214,117

(22) Filed: Jul. 19, 2016

(51) Int. Cl.
*A01D 89/00* (2006.01)

(52) U.S. Cl.
CPC ......... *A01D 89/006* (2013.01); *A01D 89/001* (2013.01)

(58) Field of Classification Search
CPC .............................. A01D 89/006; A01D 89/001
USPC .... 56/364, 200, 14.3, 14.4, 16.1, 16.2, 17.3, 56/400, 400.16, 400.21, DIG. 20
See application file for complete search history.

(56) References Cited

U.S. PATENT DOCUMENTS

| | | | | |
|---|---|---|---|---|
| 2,713,241 A * | 7/1955 | West | ...................... | A01D 57/02 56/400 |
| 4,606,180 A * | 8/1986 | Archer | ...................... | A01D 7/00 56/400.11 |
| 4,989,400 A * | 2/1991 | Wark | ...................... | A01D 43/063 383/42 |
| 5,070,576 A * | 12/1991 | Banta | ...................... | A01G 3/053 16/427 |
| 5,551,221 A * | 9/1996 | Sund | ...................... | A01D 41/06 460/122 |
| 5,595,052 A * | 1/1997 | Jasper | ...................... | A01D 57/02 56/130 |
| 6,324,823 B1 * | 12/2001 | Remillard | .............. | A01D 57/02 56/220 |
| 7,124,564 B2 * | 10/2006 | Glazik | ................... | A01D 57/02 56/220 |
| 7,856,801 B2 * | 12/2010 | Remillard | .............. | A01D 57/02 56/220 |
| 7,934,365 B2 | 5/2011 | Schumacher | | |
| 8,091,327 B2 * | 1/2012 | Batu | ..................... | A01D 61/008 198/613 |
| 2003/0126848 A1 * | 7/2003 | Bickel | .................... | A01D 57/02 56/220 |
| 2005/0091955 A1 | 5/2005 | Glazik et al. | | |
| 2007/0266692 A1 * | 11/2007 | Lolley | .................... | A01D 57/02 56/364 |
| 2007/0289280 A1 * | 12/2007 | Marquardt | ............. | A01D 57/02 56/16.1 |
| 2009/0056295 A1 * | 3/2009 | Lolley | .................. | A01D 89/002 56/220 |
| 2014/0260171 A1 * | 9/2014 | McGehee | ............. | A01D 80/02 56/400 |

(Continued)

*Primary Examiner* — Thomas B Will
*Assistant Examiner* — Mai T Nguyen
(74) *Attorney, Agent, or Firm* — Quickpatents, LLC; Kevin Prince

(57) ABSTRACT

A paddle tine for use over a pickup tine previously fixed with a harvester reel tube of a harvesting header comprises an elongated body having a central cavity therethrough and is adapted to slide over the pickup tine of the harvester reel tube. An attachment mechanism, such as a pair of resilient clips, is fixed with the proximal end of the elongated body to secure the paddle tine to the harvester reel tube over the pickup tine. Attachment straps may also be included to further secure the paddle tine to the harvester reel tube. Two opposing paddle webs project laterally away from the elongated body proximate the distal end.

11 Claims, 3 Drawing Sheets

(56) References Cited

U.S. PATENT DOCUMENTS

2014/0318097 A1   10/2014  Herring Shaw
2015/0096279 A1    4/2015  Herring Shaw

\* cited by examiner

HARVESTING TOOL

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to harvesting equipment, and more particularly to a paddle tine for use with a harvester reel tube.

DISCUSSION OF RELATED ART

Typical harvesting headers include a plurality of thin pickup tines fixed with a rotating harvester reel tube that rotates to sweep crops into the header machine. In some instances it is desirable to include a larger "paddle" type tine for feeding more of the crop into the header machine. Slipping a paddle tine over the existing pickup tine is desirable so that the pickup tine does not have to be removed, and so that the reel can be converted back to the standard thin pickup tines by simply removing the auxiliary paddle tines.

Therefore, there is a need for a device that is easily installed over an existing pickup tine on a harvester reel tube. Such a needed invention would be relatively rigid and durable so as to handle the forces experienced during use. The present invention accomplishes these objectives.

SUMMARY OF THE INVENTION

The present device is a paddle tine for use with a pickup tine fixed with a harvester reel tube of a harvesting header or other machine. The paddle tine comprises an elongated, rigid body having a central cavity therethrough from a proximal end thereof to proximate a distal end thereof. The elongated body is adapted to slide over the pickup tine of the harvester reel tube.

An attachment mechanism is fixed with the proximal end of the elongated body. Preferably the attachment mechanism includes a pair of resilient clips. In some embodiments each resilient clip includes a relatively resilient inner portion fixed within a relatively rigid outer portion.

In some embodiments, the attachment mechanism further includes a pair of loops projecting away from each of the clips, such that the paddle tine may be slid over the pickup tine and secured to the harvester reel tube with the resilient clips, a pair of plastic, resilient fastening ties being threaded through each of the loops and about the harvester reel tube to further secure the paddle tine to the harvester reel tube. In some embodiments these fastening ties are replaced with hook-and-loop fastening strips. In some embodiments the fastening ties or hook-and-loop fastening strips are applied to embodiments of the paddle tine devoid of the loops.

Two opposing paddle webs project laterally away from the elongated body proximate the distal end. Preferably each of the two opposing paddle webs includes a reinforced bottom portion having a thickness greater than a web portion thereof.

The present invention is a device that is easily installed over an existing pickup tine on a harvester reel tube. The present device is relatively rigid and durable so as to handle the forces experienced during use. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
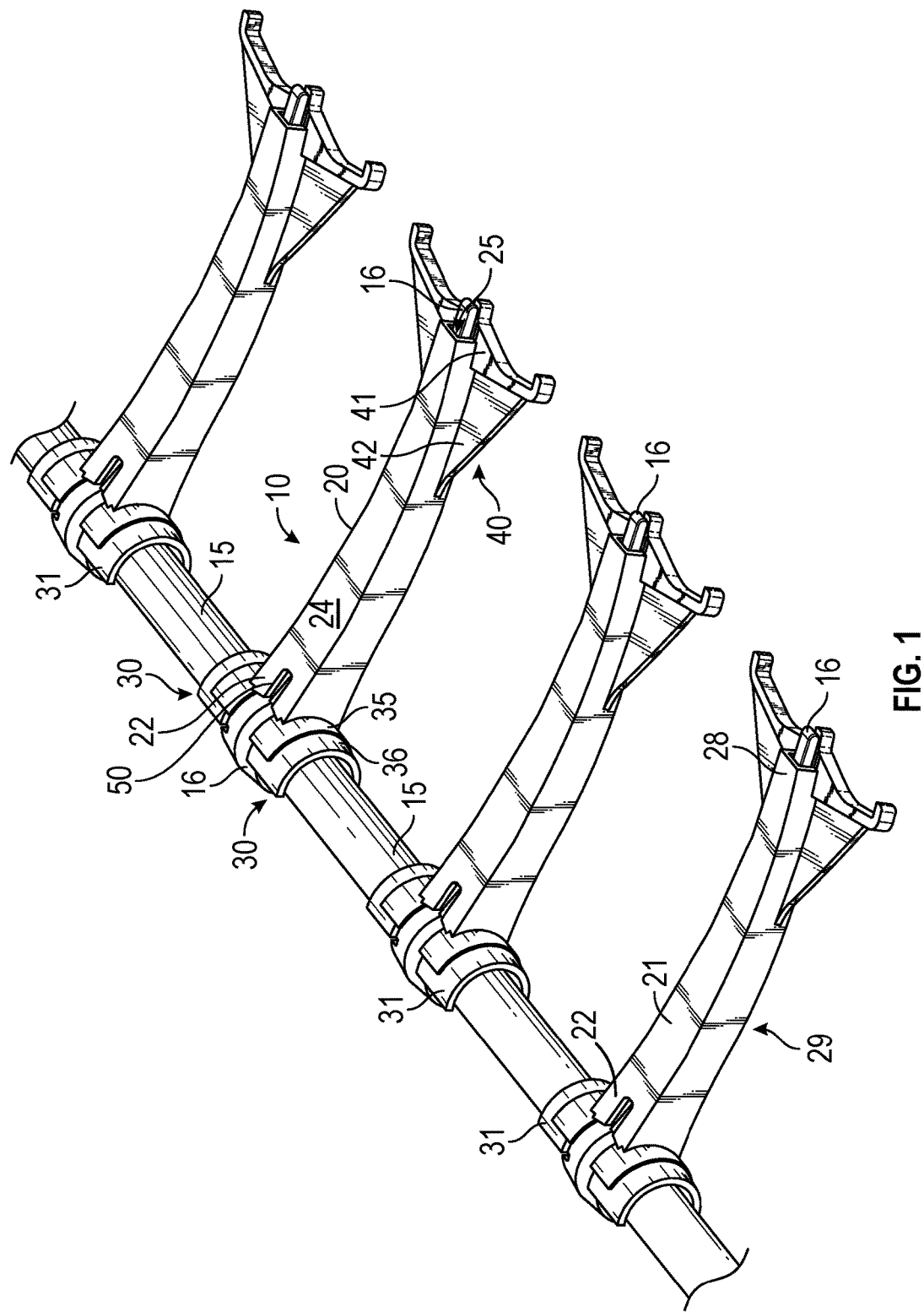
FIG. 1 is a perspective view of a harvester reel tube having pickup tines fixed therewith, the paddle tine of the present invention positioned over the pickup tines.
Figure 2:
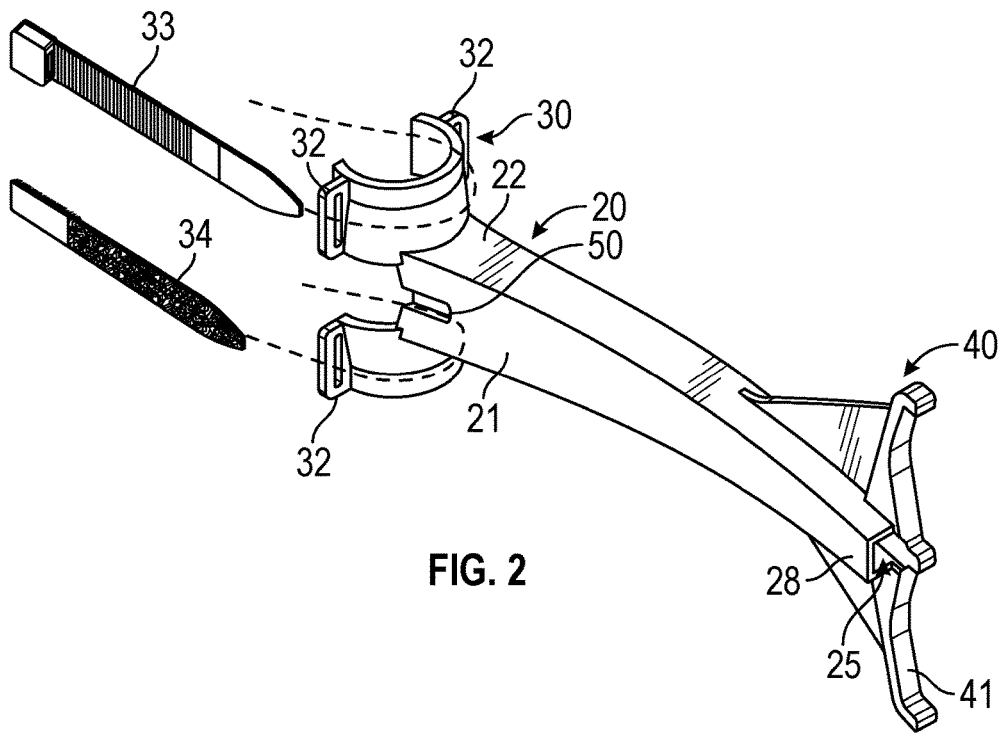
FIG. 2 is a perspective view of the invention showing two different types of attachment mechanisms.
Figure 3:
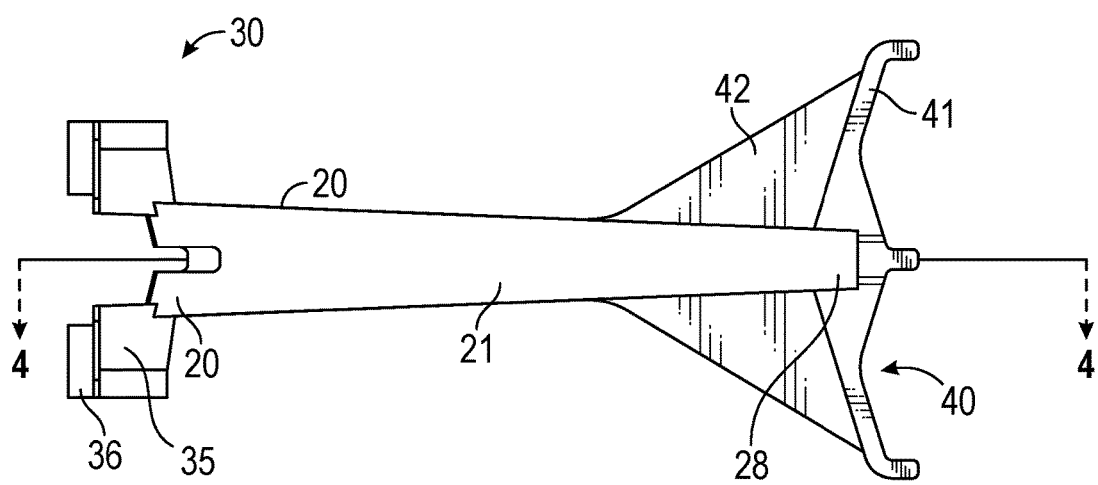
FIG. 3 is a front elevational view of the invention.
Figure 4:
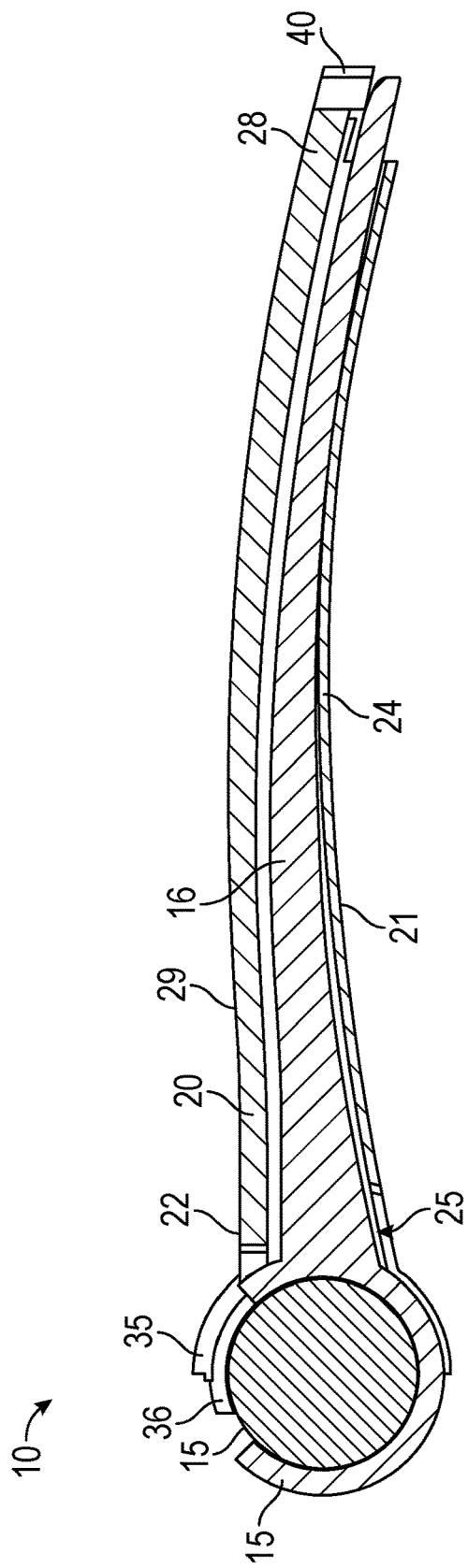
FIG. 4 is a cross-sectional view of the invention, taken along line 4-4 of FIG. 3.

FIGS. 1 and 2 illustrate a paddle tine 10 for use with a pickup tine 16 fixed with a harvester reel tube 15 of a harvesting header or other machine (not shown). The paddle tine 10 comprises an elongated, rigid body 20 having a central cavity 25 therethrough from a proximal end 22 to proximate a distal end 28 thereof. The elongated body 20 is adapted to slide over the pickup tine 16 of the harvester reel tube 15 (FIG. 4). As most pickup tines 16 are curved or arched, preferably the elongated body 20 is arched from the distal end 28 to the proximal end 22 from a side view (FIG. 4). A front side 21 of the elongated body 20 forms a concave face 24 (FIGS. 3 and 4). The front side 21 and rear side 29 preferably each include a longitudinally-aligned notch 50 for receiving therein portions of the pickup tine 16. Preferably the elongated body 20 is made from a rigid injection-molded plastic material.

An attachment mechanism 30 is fixed with the proximal end 22 of the elongated body 20. Preferably the attachment mechanism 30 includes a pair of resilient clips 31 (FIGS. 1, 3 and 4). In some embodiments each resilient clip 31 includes a relatively resilient inner portion 36 fixed within a relatively rigid outer portion 35, the resilient inner portion 36 accommodating a shoulder of the pickup tine 16.

In some embodiments, the attachment mechanism 30 includes a pair of loops 32 (FIG. 2) projecting away from each of the clips 31, such that the paddle tine 10 may be slid over the pickup tine 16 and secured to the harvester reel tube 15 with the resilient clips 31, a pair of plastic, resilient fastening ties 33 being threaded through each of the loops 32 and about the harvester reel tube 15 to further secure the paddle tine 10 to the harvester reel tube 15. In some embodiments the fastening ties 33 are replaced with hook-and-loop fastening strips 34. In some embodiments the fastening ties 33 or hook-and-loop fastening strips 34 are applied to embodiments of the paddle tine devoid of the loops 32 (not shown), and simply fasten around the resilient clips 31.

Two opposing paddle webs 40 project laterally away from the elongated body 20 proximate the distal end 28. Preferably each of the two opposing paddle webs 40 includes a reinforced bottom portion 41 having a thickness greater than a web portion 42 thereof (FIGS. 1 and 3).

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A paddle tine for use with a pickup tine fixed with a harvester reel tube, comprising:
    an elongated body having a central cavity therethrough from a proximal end to proximate a distal end, the elongated body adapted to slide over the pickup tine of the harvester reel tube, the central cavity being only open at ends thereof, enclosing the pickup tine therein;
    an attachment mechanism fixed with the proximal end of the elongated body; and
    two opposing paddle webs projecting laterally away from the elongated body proximate the distal end;
    the attachment mechanism including a pair of resilient clips fixed with opposing sides of the proximal end of the elongated body;
    the attachment mechanism includes a pair of loops projecting away from each of the clips, whereby the paddle tine may be slid over the pickup tine and secured to the harvester reel tube with the resilient clips, a pair of hook-and-loop fastening strips being threaded through each of the loops and about the harvester reel tube to further secure the paddle tine to the harvester reel tube;
    whereby the paddle tine may be slid over the pickup tine and secured to the harvester reel tube with the attachment mechanism.

2. The paddle tine of claim 1 wherein each of the pair of resilient clips includes an inner portion fixed within an outer portion, the outer portion being thicker and more resilient than the inner portion.

3. A paddle tine for use with a pickup tine fixed with a harvester reel tube, comprising:
    an elongated body having a central cavity therethrough from a proximal end to proximate a distal end, the elongated body adapted to slide over the pickup tine of the harvester reel tube, the central cavity being only open at ends thereof, enclosing the pickup tine therein;
    an attachment mechanism fixed with the proximal end of the elongated body;
    the attachment mechanism including a pair of resilient clips fixed with opposing sides of the proximal end of the elongated body; and
    two opposing paddle webs projecting laterally away from the elongated body proximate the distal end;
    the attachment mechanism including a pair of loops projecting away from each of the clips and a pair of fastening ties, whereby the paddle tine may be slid over the pickup tine and secured to the harvester reel tube with the resilient clips, each fastening tie being threaded through two corresponding loops and about the harvester reel tube to further secure the paddle tine to the harvester reel tube;

whereby the paddle tine may be slid over the pickup tine and secured to the harvester reel tube with the attachment mechanism.

4. A paddle tine for use with a pickup tine fixed with a harvester reel tube, comprising:
an elongated body having a central cavity therethrough from a proximal end to proximate a distal end, the elongated body adapted to slide over the pickup tine of the harvester reel tube, the central cavity being only open at ends thereof, enclosing the pickup tine therein;
an attachment mechanism fixed with the proximal end of the elongated body;
the attachment mechanism including a pair of resilient clips fixed with opposing sides of the proximal end of the elongated body; and
two opposing paddle webs projecting laterally away from the elongated body proximate the distal end;
the attachment mechanism including a pair of loops projecting away from each of the clips and a pair of hook-and-loop fastening strips, whereby the paddle tine may be slid over the pickup tine and secured to the harvester reel tube with the resilient clips, each fastening strip being threaded through two corresponding loops and about the harvester reel tube to further secure the paddle tine to the harvester reel tube;
whereby the paddle tine may be slid over the pickup tine and secured to the harvester reel tube with the attachment mechanism.

5. A paddle tine for use with a pickup tine fixed with a harvester reel tube, comprising:
an elongated body having a central cavity therethrough from a proximal end to proximate a distal end, the elongated body adapted to slide over the pickup tine of the harvester reel tube;
an attachment mechanism fixed with the proximal end of the elongated body; and
two opposing paddle webs projecting laterally away from the elongated body proximate the distal end;
whereby the paddle tine may be slid over the pickup tine and secured to the harvester reel tube with the attachment mechanism; and
wherein each of the pair of resilient clips includes an inner portion fixed within an outer portion, the outer portion being thicker and more resilient than the inner portion.

6. The paddle tine of claim 5 wherein the attachment mechanism includes a pair of resilient clips fixed with opposing sides of the proximal end of the elongated body.

7. The paddle tine of claim 6 wherein the paddle tine is configured to be slid over the pickup tine and secured to the harvester reel tube with the resilient clips, a pair of fastening ties being threaded about the harvester reel tube and the attachment mechanism to further secure the paddle tine to the harvester reel tube.

8. The paddle tine of claim 6 wherein each of the pair of resilient clips includes an inner portion fixed within an outer portion, the outer portion being thicker and more resilient than the inner portion.

9. The paddle tine of claim 5 wherein the elongated body is arced from the distal end to the proximal end when looking at the elongated body from either side.

10. The paddle tine of claim 5 wherein front and rear sides of the elongated body proximate the proximal each include a longitudinally-aligned notch.

11. The paddle tine of claim 5 wherein each of the two opposing paddle webs include a reinforced bottom portion having a thickness greater than a web portion thereof.

* * * * *